US006813075B2

(12) United States Patent
Inaba

(10) Patent No.: US 6,813,075 B2
(45) Date of Patent: Nov. 2, 2004

(54) STEREO SLIDE VIEWER

(76) Inventor: Minoru Inaba, 1116, Oaza Samukawa, Oyama-shi, Tochigi-ken (JP)

( * ) Notice: Subject to any disclaimer, the term of this patent is extended or adjusted under 35 U.S.C. 154(b) by 0 days.

(21) Appl. No.: 10/098,942

(22) Filed: Mar. 15, 2002

(65) Prior Publication Data

US 2002/0145798 A1 Oct. 10, 2002

(30) Foreign Application Priority Data

Apr. 9, 2001 (JP) ....................................... 2001-109382

(51) Int. Cl.[7] ........................... G02B 27/22; A47G 1/06

(52) U.S. Cl. ....................... 359/466; 359/462; 359/469; 40/743; 40/707; 40/739

(58) Field of Search ................................. 359/466, 469, 359/462, 467, 474, 472, 477; 40/700, 701, 707, 710, 739, 743, 362, 364, 365, 366; 353/7; 396/517, 520, 528

(56) References Cited

U.S. PATENT DOCUMENTS 3,850,505 A * 11/1974 Ratliff ........................ 359/466
4,726,653 A * 2/1988 Thaler et al. ............... 359/466
5,381,266 A * 1/1995 Mizukawa et al. ......... 359/466

* cited by examiner

*Primary Examiner*—Audrey Chang
(74) *Attorney, Agent, or Firm*—Fattibene & Fattibene; Paul A. Fattibene; Arthur T. Fattibene

(57) ABSTRACT

Therefore, it is an object of the present invention in the slide mount holder section, so that a rectangular stereo slide mount and a stereo slide mount having circular-arc left and right opposite ends can be smoothly loaded and positioned, without using any adapter. In a stereo slide viewer comprising a grooved slide mount holder section 23, left and right internal walls 23*a* and 23*b* of the slide mount holder section 23 are formed slantwise such that the distance between the internal walls is narrowed in the loading direction of a stereo slide mount 7, 7', and the distance between the left and right internal walls 23*a* and 23*b* in an internal bottom portion 23*c* of the slide mount holder section is formed so as to become substantially the same size as the left-right length Wa, Wb of the loading point 23*c* of the stereo slide mount 7, 7', so that the loading point 7*a,* 7'*a* of the stereo slide mount is positioned with the left and right internal walls 23*a* and 23*b* in the internal bottom portion 23*c* of the slide mount holder section.

11 Claims, 9 Drawing Sheets

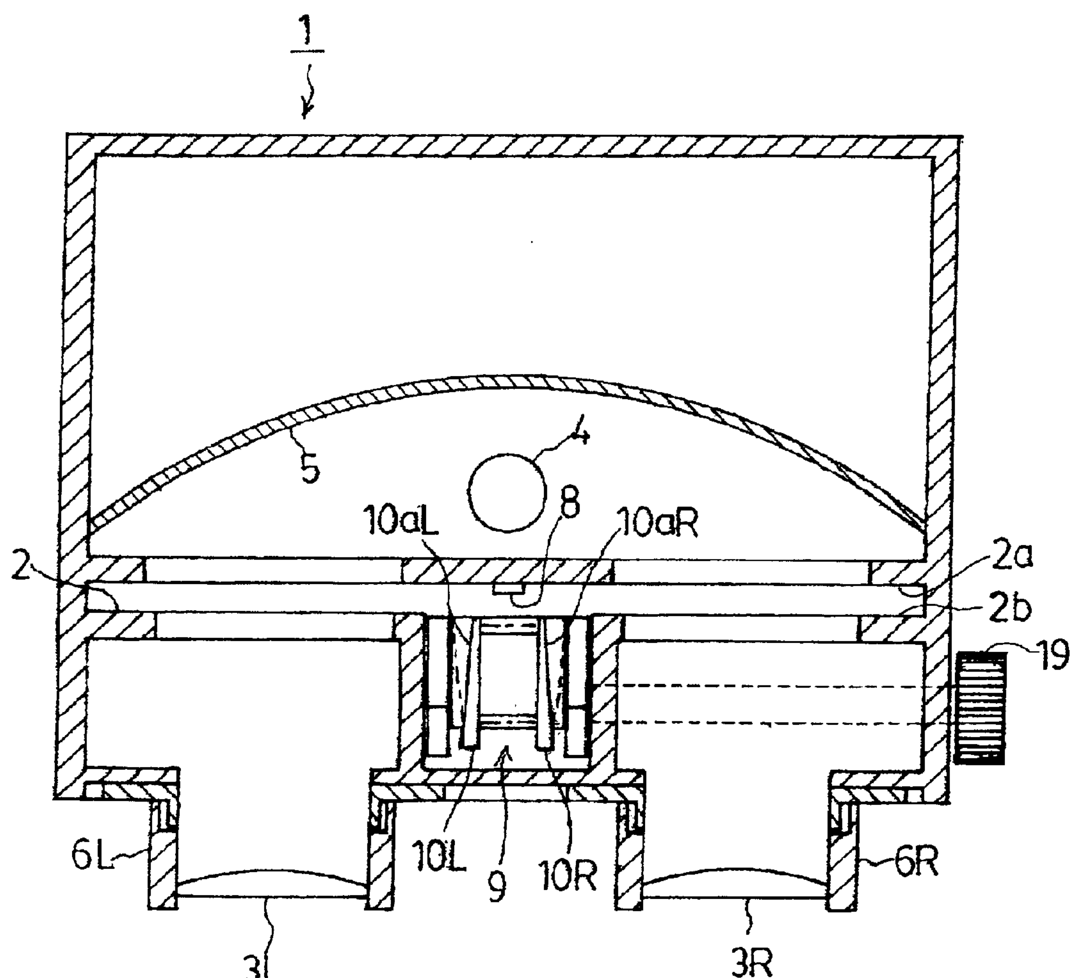
F I G. 4

STEREO SLIDE VIEWER

BACKGROUND OF THE INVENTION

1. Field of the Invention

The present invention relates to a stereo slide viewer, and more specifically, relates to a stereo slide viewer in which the shape of a slide mount holder section has been improved, for better loading of the stereo slide mount and better positioning.

2. Description of the Related Art

The present applicant has filed an application for this type of stereo slide mount and stereo slide viewer (Japanese Patent Application No. Hei 11-273315), and this prior application will be first described with reference to FIG. 4 to FIG. 9.

In FIG. 4, reference symbol 1 denotes a stereo slide viewer, and this stereo slide viewer 1 is provided with a pair of left and right ocular lenses 3L and 3R at the rear of a slide mount holder section 2 of a channel shape, and provided with an illumination lamp 4 and a circular reflector 5 in front of the slide mount holder section 2, so that by lighting the illumination lamp 4, light is irradiated onto the backside of the slide mount holder section 2 by the circular reflector 5. Ocular lens holders 6L and 6R for the left and right ocular lenses 3L and 3R have a construction capable of adjusting the distance between optical axes and focus in the direction of the optical axis.

A stereo slide mount 7 shown in FIG. 5 is freely loadable into the slide mount holder section 2. For positioning of the stereo slide mount 7 in the back and forth direction, a flat spring 8 is provided on the front wall surface 2*a* of the slide mount holder section 2, and the stereo slide mount 7 is pressed against the rear wall surface 2*b* of the slide mount holder section 2.

Moreover, a film pitch adjusting apparatus 9 is arranged in the middle of the left and right ocular lenses 3L and 3R, and outside of the visual field of the ocular lenses 3L and 3R. This film pitch adjusting apparatus 9 is for adjusting the interval between left and right film holders 11L and 11R of the stereo slide mount 7 loaded into the slide mount holder section 2, by rotating helical cams 10L and 10R of the film pitch adjusting apparatus 9. These helical cams 10L and 10R are formed substantially in a semicircular shape as seen from the side, and constructed such that in the initial position, the helical cams 10L and 10R do not come into the slide mount holder section 2.

The film pitch adjusting operation and film mounting procedure will be described next. Two left and right film holders 11L and 11R are mounted on a base frame 12 of the stereo slide mount 7, and the left and right film holders 11L and 11R are brought closest to each other, to thereby mount films 13L and 13R on the film holders 11L and 11R. The base frame 12 has left and right windows 14L and 14R, and the left and right film holders 11L and 11R have windows 15L and 15R, respectively, so that the light of the illumination lamp 4 reaches the films 13L and 13R.

Then, a collimation pattern mask 16 shown in FIG. 6 is attached to the base frame 12 having the films 13L and 13R mounted thereon. The collimation pattern mask 16 is provided with a square window 17 so that the helical cams 10L and 10R can freely enter into and come out, as well as left and right transparent windows 18L and 18R. The same collimation pattern CP mainly composed of a plurality of vertical lines is respectively printed on the backside of the transparent windows 18L and 18R.

Subsequently, the base frame 12 attached with the collimation pattern mask 16 is loaded into the slide mount holder section 2 of the stereo slide viewer 1 shown in FIG. 4.

Then, sense of intimacy of images in the films 13L and 13R with respect to the collimation pattern CP of the collimation pattern mask 16 is observed, in a stereoscopic vision through the ocular lenses 3L and 3R of the stereo slide viewer 1. If the stereoscopic images are seen in the same plane as the collimation patterns CP or beyond the collimation patterns CP, the film pitch of the stereo slide mount 7 is appropriate, and adjustment of the film pitch is not necessary.

If the film pitch is not appropriate, a knob 19 of the stereo slide viewer 1 is rotated to adjust the film pitch. That is to say, if the knob 19 is rotated in the clockwise direction, the helical cams 10L and 10R rotate from the initial position to enter into the slide mount holder section 2, so that the points of the cam surfaces 10*a*L and 10*a*R enter into the two film holders 11L and 11R to push the film holders 11L and 11R outwards. As a result, the interval between the film holders 11L and 11R increases.

At this time, the area where the outside edges of the screen of the films 13L and 13R are masked by the edges of the transparent windows 18L and 18R of the collimation pattern mask 16 increases, and the distance of the stereoscopic image moves backwards with respect to the collimation patterns CP. Then, at the time when the stereoscopic image is seen in the same plane as the collimation patterns CP or beyond the collimation patterns CP, it is the optimum film pitch. At this time, the knob 19 is reversely rotated to thereby return the helical cams 11L and 10R to the initial position. During this time, the film holders 11L and 11R are held in the optimum film pitch position.

Subsequently, the stereo slide mount 7 is taken out from the slide mount holder section 2, to remove the collimation pattern mask 16 from the base frame 12, and instead thereof, a cover frame 21 comprising two windows 20L and 20R shown in FIG. 7 is loaded. As a result, the stereo slide mount 7 having the optimum film pitch is completed.

The completed stereo slide mount 7 can be loaded into the slide mount holder section 2 of the stereo slide viewer 1 and used for appreciating the films. Even if the knob 19 is rotated at the time of appreciation, since the film holders 11L and 11R are covered with the cover frame 21, the helical cams 10L and 10R are not brought into contact with the film holders 11L and 11R, and hence the film pitch does not change.

Moreover, at the time of adjusting the film pitch, in the case where the film pitch exceeds the optimum pitch and become excessive, and hence the stereoscopic image is seen far away from the collimation patterns CP, CP the film pitch is readjusted. At this time, the knob 19 is reversely rotated to return the helical cams 10L and 10R to the initial position. The stereo slide mount 7 is taken out from the slide mount holder section 2, and the left and right film holders 11L and 11R are made to slide to the position where the film holders 11L and 11R are in the closest position. Then, the stereo slide mount 7 is reloaded, so as to readjust the film pitch by rotating the knob 26.

The stereo slide viewer 1 is a stereo slide viewer equipped with the film pitch adjusting apparatus 9, but other than the stereo slide viewer 1, a relatively cheap stereo slide viewer (not shown) used mainly for appreciation, without having the film pitch adjusting apparatus, is also widely known.

FIG. 8(*a*) shows the stereo slide mount 7, which can be loaded into either a stereo slide viewer 1 having the film pitch adjusting apparatus 9, or a stereo slide viewer not having the film pitch adjusting apparatus and used mainly for appreciation. In more detail, the left and right opposite ends are formed in a circular arc. If the vertical dimension of the stereo slide mount 7 is designated as H, the lateral minimum dimension is designated as Wa, the lateral maximum dimension is designated as wd, and the radius of the circular arc of the left and right opposite ends is designated as r, then, the stereo slide mount 7 is formed in such a relation that:

$$Wd=\{(Wa)^2+(H)^2\}^{1/2}$$

$$r=[\{(Wa)^2+(H)^2\}^{1/2}/2.$$

On the other hand, FIG. 8(*b*) shows another rectangular stereo slide mount 7', which is mainly loaded into a stereo slide viewer used for appreciation, without having the film pitch adjusting apparatus. It is formed in a rectangular shape, with the vertical dimension being H, and the lateral dimension being Wb, which is the same size as the lateral minimum dimension Wa of the stereo slide mount 7.

The slide mount holder section 2 shown in FIG. 9 is provided in both of the stereo slide viewer 1 having the film pitch adjusting apparatus 9, and the stereo slide viewer not having the film pitch adjusting apparatus and used mainly for appreciation, and both of the stereo slide mounts 7 and 7' can be loaded therein. The slide mount holder section 2 is formed such that the left and right internal walls of the slide mount holder section 2 are in parallel with each other, and the dimension Wg between the left and right internal walls is substantially the same as the lateral maximum dimension Wd of the stereo slide mount 7 having a large lateral dimension.

Therefore, as shown in FIG. 9(*a*), the circular-arc stereo slide mount 7 can be smoothly loaded into the slide mount holder section 2, and positioning is easily performed in such a manner that the portion of the stereo slide mount 7 having the lateral maximum dimension comes in contact with the left and right internal walls of the slide mount holder section 2.

However, as shown in FIG. 9(*b*), the rectangular stereo slide mount 7' has a lateral dimension Wb shorter than the dimension Wg between the left and right internal walls of the slide mount holder section 2. Hence, an adapter 22 for positioning is required in the slide mount holder section 2. Accordingly, when the stereo slide mount 7' is used, the cost for the adapter 22 is required additionally, and there is another problem in that when the stereo slide mount 7 is used by replacing the stereo slide mount 7', the adapter 22 must be removed, and the adapter 22 must be stored.

Therefore, there is a technical problem to be solved in the stereo slide viewer, so that a rectangular stereo slide mount and a stereo slide mount having circular-arc left and right opposite ends can be smoothly loaded and positioned in the slide mount holder section, without using any adapter. It is therefore an object of the present invention to solve this problem.

SUMMARY OF THE INVENTION

The present invention has been proposed in order to achieve the above-described object, and provides:

a stereo slide viewer comprising left and right ocular lenses, and a grooved slide mount holder section for selectively loading a rectangular stereo slide mount and a stereo slide mount having the left and right opposite ends in a circular-arc shape, in front of the left and right ocular lenses, wherein left and right internal walls of the slide mount holder section are formed slantwise such that the distance between the internal walls is narrowed in the loading direction of the stereo slide mount, and the distance between the left and right internal walls in the internal bottom portion of the slide mount holder section is formed so as to become substantially the same size as the left-right length of the loading point of the stereo slide mount, so that the loading point of the stereo slide mount is positioned with the left and right internal walls in the internal bottom portion of the slide mount holder section;

a stereo slide viewer comprising left and right ocular lenses, and a grooved slide mount holder section for selectively loading a rectangular stereo slide mount and a stereo slide mount having the left and right opposite ends in a circular-arc shape, in front of the left and right ocular lenses, wherein left and right internal walls of the slide mount holder section are formed such that the left and right internal walls are provided in parallel over a predetermined length in the loading direction from a loading port of the stereo slide mount or formed slantwise so as to be narrowed in the loading direction of the stereo slide mount, as well as being formed slantwise so as to be further narrowed in the loading direction from the position of the predetermined length, and the distance between the left and right internal walls in the internal bottom portion of the slide mount holder section is formed so as to become substantially the same size as the left-right length of the loading point of the stereo slide mount, so that the loading point of the rectangular stereo slide mount is positioned with the left and right internal walls in the internal bottom portion of the slide mount holder section, and the opposite ends of the circular-arc stereo slide mount is positioned with the left and right internal walls in the predetermined length; and a stereo slide viewer comprising left and right ocular lenses, and a grooved slide mount holder section for selectively loading a rectangular stereo slide mount and a stereo slide mount having the left and right opposite ends in a circular-arc shape, in front of the left and right ocular lenses, wherein left and right internal walls of the slide mount holder section are formed in a curved shape protruding inwards over a predetermined length in the loading direction from a loading port of the stereo slide mount, and formed slantwise so as to be narrowed in the loading direction from the position of the predetermined length, and the distance between the left and right internal walls in the internal bottom portion of the slide mount holder section is formed so as to become substantially the same size as the left-right length of the loading point of the stereo slide mount, so that the loading point of the rectangular stereo slide mount is positioned with the left and right internal walls in the internal bottom portion of the slide mount holder section, and the opposite ends of the circular-arc stereo slide mount is positioned with the curved left and right internal walls in the predetermined length.

As will be described in detail in a first embodiment, the invention according to a first aspect is a stereo slide viewer, wherein left and right internal walls of the slide mount holder section are formed slantwise such that the distance between the internal walls is narrowed in the loading direction of the stereo slide mount, and the distance between the left and right internal walls in the internal bottom portion of the slide mount holder section is formed so as to become substantially the same size as the left-right length of the loading point of the stereo slide mount, so that the loading point of the stereo slide mount is positioned with the left and right internal walls in the internal bottom portion of the slide mount holder section. As a result, the stereo slide mount can be smoothly loaded into the slide mount holder section, and positioning thereof can be easily performed, without using an adapter in the conventional case.

Moreover, the invention according to a second aspect is a stereo slide viewer, wherein left and right internal walls of the slide mount holder section are formed such that the left and right internal walls are provided in parallel over a predetermined length in the loading direction from a loading port of the stereo slide mount or formed slantwise so as to be narrowed in the loading direction of the stereo slide mount, as well as being formed slantwise so as to be further narrowed in the loading direction from the position of the predetermined length, and the distance between the left and right internal walls in the internal bottom portion of the slide mount holder section is formed so as to become substantially the same size as the left-right length of the loading point of the stereo slide mount, so that the loading point of the rectangular stereo slide mount is positioned with the left and right internal walls in the internal bottom portion of the slide mount holder section, and the opposite ends of the circular-arc stereo slide mount is positioned with the left and right internal walls in the predetermined length. As a result, the same effects as those of the invention according to the first aspect can be expected. Further, since the left and right internal walls and the stereo slide mount are brought into contact with each other in the predetermined length, more accurate positioning can be performed, and the positioning condition is maintained. Hence, it can be prevented that the stereo slide mount comes up from the slide mount holder section.

Furthermore, the invention according to a third aspect is a stereo slide viewer, wherein left and right internal walls of the slide mount holder section are formed in a curved shape protruding inwards over a predetermined length in the loading direction from a loading port of the stereo slide mount, and formed slantwise so as to be narrowed in the loading direction from the position of the predetermined length, and the distance between the left and right internal walls in the internal bottom portion of the slide mount holder section is formed so as to become substantially the same size as the left-right length of the loading point of the stereo slide mount, so that the loading point of the rectangular stereo slide mount is positioned with the left and right internal walls in the internal bottom portion of the slide mount holder section, and the opposite ends of the circular-arc stereo slide mount is positioned with the curved left and right internal walls in the predetermined length. As a result, the same effects as those of the invention according to the second aspect can be expected, and hence this invention exhibits enormous effects.

BRIEF DESCRIPTION OF THE DRAWINGS

FIG. 1(*b*) shows one embodiment of the present invention according to the first aspect, and is a longitudinal sectional view of a slide mount holder section loaded with a rectangular stereo slide mount;

FIG. 2(*b*) shows one embodiment of the present invention according to the second aspect, and is a longitudinal sectional view of a slide mount holder section loaded with a rectangular stereo slide mount;

FIG. 3(*b*) shows one embodiment of the present invention according to the third aspect, and is a longitudinal sectional view of a slide mount holder section loaded with a rectangular stereo slide mount;

FIG. 4 is a plan sectional view of a stereo slide viewer, showing a conventional example;

FIG. 8(*b*) is an elevational view of a rectangular stereo slide mount, showing a conventional example;

FIG. 9(*b*) shows a conventional example, and is a longitudinal sectional view of a slide mount holder section loaded with a rectangular shaped stereo slide mount.

PREFERRED EMBODIMENT OF THE INVENTION

Figure 1A:
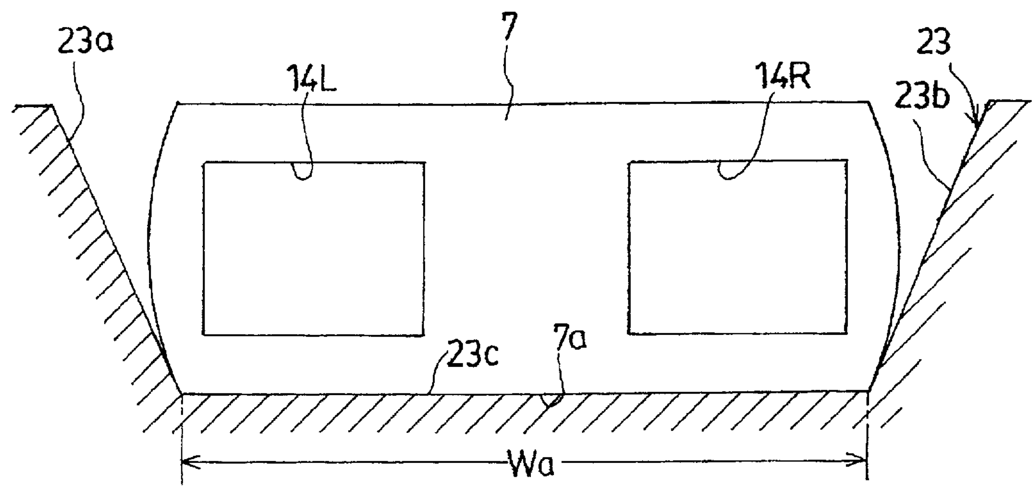
FIG. 1(*a*) shows one embodiment of the present invention according to the first aspect, and is a longitudinal sectional view of a slide mount holder section loaded with a circular-arc stereo slide mount.
Figure 1B:
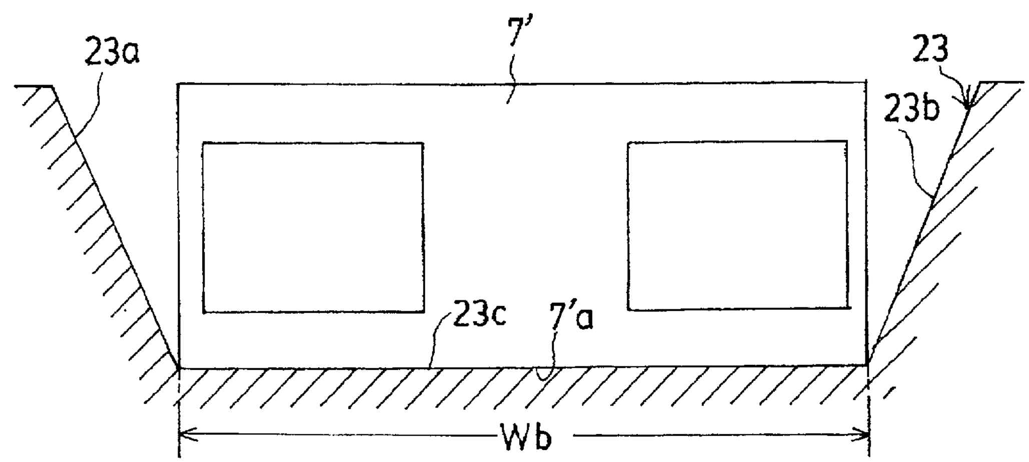

One embodiment of the invention will now be described in detail with reference to FIG. 1 to FIG. 3. For the convenience sake of explanation, the same constituents as those in the conventional example are denoted with the same reference symbols, and the description thereof is omitted. In FIG. 1, reference symbol 23 is a slide mount holder section in the invention according to the first aspect, and this slide mount holder section 23 is applicable for both of a stereo slide viewer (not shown) comprising a film pitch adjusting apparatus (not shown) and a stereo slide viewer (not shown) not comprising the film pitch adjusting apparatus. The left and right internal walls 23*a* and 23*b* of the slide mount holder section 23 are formed slantwise so as to be narrowed in the loading direction of the stereo slide mount 7 having circular-arc left and right opposite ends or the rectangular stereo slide mount 7', and the distance between the left and right internal walls 23*a* and 23*b* in the internal bottom portion 23*c* of the slide mount holder section is formed so as to become substantially the same size as the left-right length Wa, Wb of the loading point 7*a*, 7'*a* of the stereo slide mount 7, 7', respectively.

As shown in FIG. 1(*a*), the circular-arc stereo slide mount 7 can be loaded smoothly into the slide mount holder section 23, and since the loading point 7*a* of the stereo slide mount 7 is fitted between the left and right internal walls 23*a* and 23*b* in the internal bottom portion 23*c* of the slide mount holder section, positioning is easy.

Moreover, as shown in FIG. 1(*b*), even in the case where the rectangular stereo slide mount 7' is used, the stereo slide mount 7' can be smoothly loaded into the slide mount holder section 23, and since the loading point 7'*a* of the stereo slide mount 7' is fitted between the left and right internal walls 23*a* and 23*b* in the internal bottom portion 23*c* of the slide mount holder section, positioning is easy, and it is not necessary to use the adapter in the conventional case.

However, in this slide mount holder section 23, at the time of adjusting the film pitch by sliding the film holder (not shown), which is mounted on the stereo slide mount 7, sliding resistance differs at the left and right sides. Therefore, there may be a problem in that the stereo slide mount 7 comes up on one side of the left and right internal walls 23_a_ and 23_b_ of the slide mount holder section 23.

Moreover, in positioning of the stereo slide mount 7, since positioning is performed with a corner of the stereo slide mount 7 and a corner of the slide mount holder section 23, the positioning accuracy is not so good.

Since the stereo slide mount 7' is only for appreciation, and hence highly accurate positioning is not necessary, and the film pitch is not adjusted by sliding the film holder. Therefore, there is no problem that the stereo slide mount 7' comes up on one side.

Figure 2A:
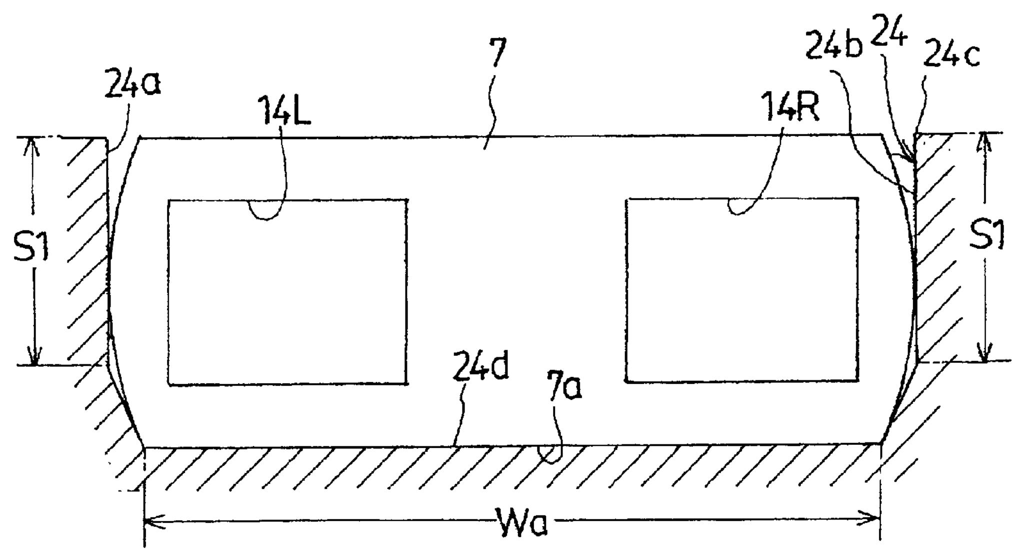
FIG. 2(*a*) shows one embodiment of the present invention according to the second aspect, and is a longitudinal sectional view of a slide mount holder section loaded with a circular-arc stereo slide mount.
Figure 2B:
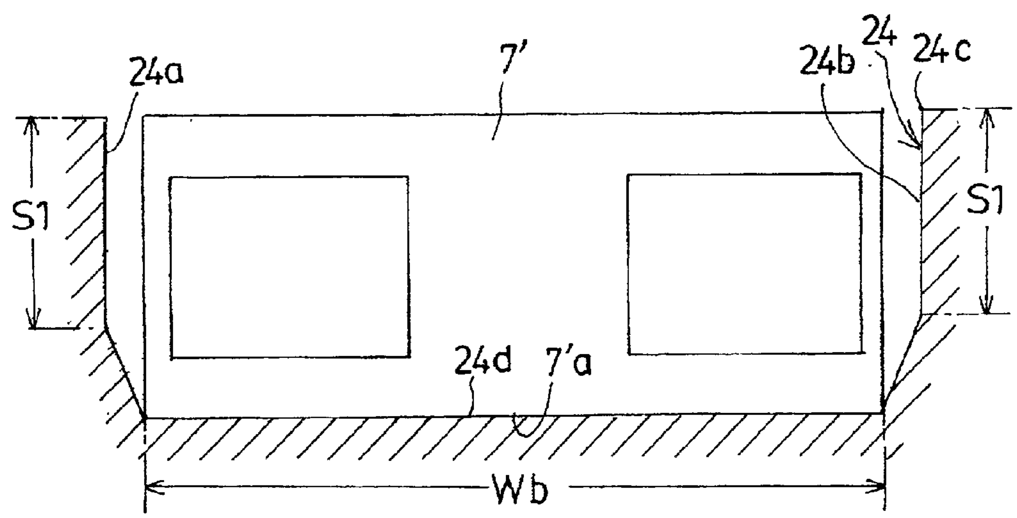

In FIG. 2, reference symbol 24 denotes a slide mount holder section in the invention according to the second aspect, and the slide mount holder section 24 is applicable for both of a stereo slide viewer comprising a film pitch adjusting apparatus and a stereo slide viewer not comprising the film pitch adjusting apparatus. The left and right internal walls 24_a_ and 24_b_ of the slide mount holder section 24 are formed in parallel over a predetermined length S1 in the loading direction from a loading port 24_c_ of the stereo slide mount 7, 7', or formed slantwise so as to be narrowed in the loading direction thereof, as well as being formed slantwise so as to be further narrowed in the loading direction from the position of the predetermined length S1, and the distance between the left and right internal walls 24_a_ and 24_b_ in the internal bottom portion 24_d_ of the slide mount holder section is formed so as to become substantially the same size as the left-right length Wa, Wb of the loading point 7_a_, 7'_a_ of the stereo slide mount 7, 7', respectively.

The reason why the left and right internal walls 24_a_ and 24_b_ are formed slantwise over the predetermined length S1 from the loading port in the loading direction is to provide a slant for removing the slide holder section 24 from the mold at the time of injection molding.

Therefore, in FIG. 2(_a_), the stereo slide mount 7 can be smoothly loaded into the slide mount holder section 24, and since the loading point 7_a_ of the stereo slide mount 7 is fitted between the left and right internal walls 24_a_ and 24_b_ in the internal bottom portion 24_d_ of the slide mount holder section 24, positioning is easy. Moreover, since the left and right internal walls 24_a_ and 24_b_ and the outermost end portion of the stereo slide mount 7 come in contact with each other in the predetermined length S1, highly accurate positioning is possible, and the positioning condition is maintained. Hence, when this slide mount holder section 24 is used, coming up of the stereo slide mount 7 does not occur.

Furthermore, as shown FIG. 2(_b_), even in the case where the stereo slide mount 7' is used, the stereo slide mount 7' can be smoothly loaded into the slide mount holder section 24, and since the loading point 7'_a_ of the stereo slide mount 7' is fitted between the left and right internal walls 24_a_ and 24_b_ in the internal bottom portion 24_d_ of the slide mount holder section 24, positioning is easy, and it is not necessary to use the adapter in the conventional case.

Figure 3A:
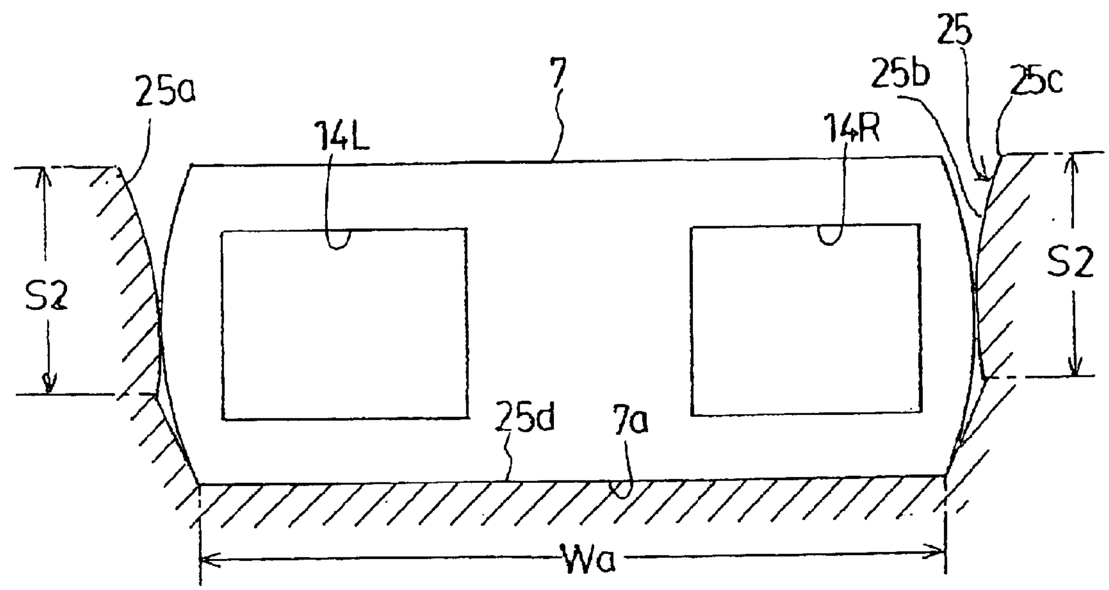
FIG. 3(*a*) shows one embodiment of the present invention according to the third aspect, and is a longitudinal sectional view of a slide mount holder section loaded with a circular-arc stereo slide mount.
Figure 3B:
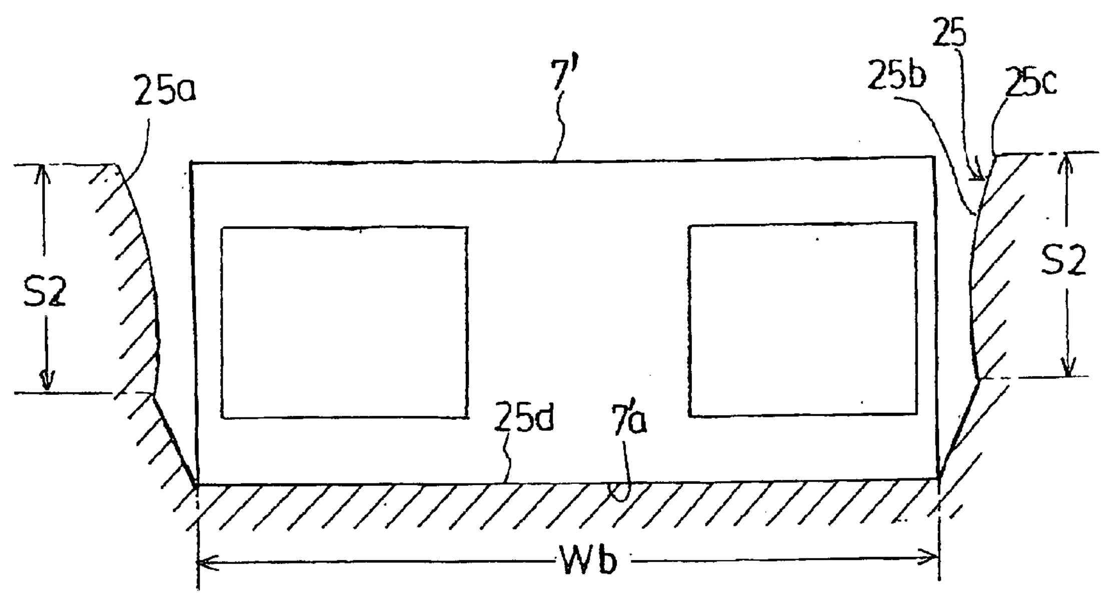
Figure 5:
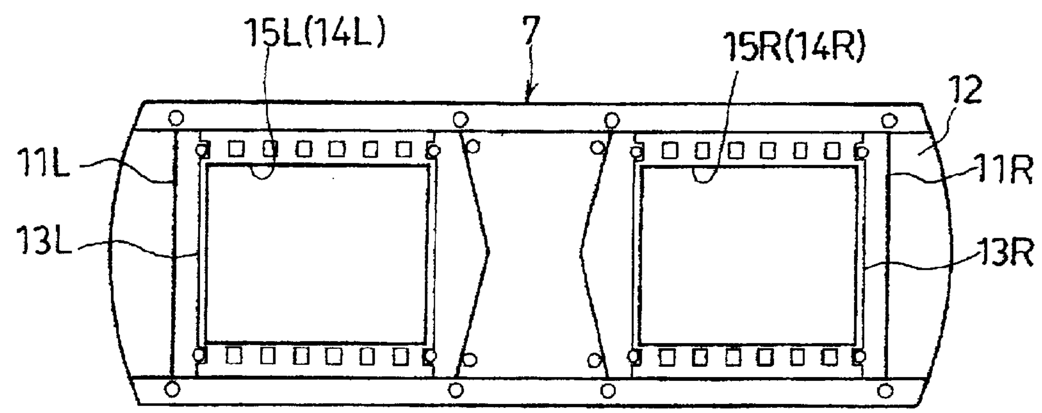
FIG. 5 is an elevational view of a stereo slide mount, showing a conventional example.
Figure 6:
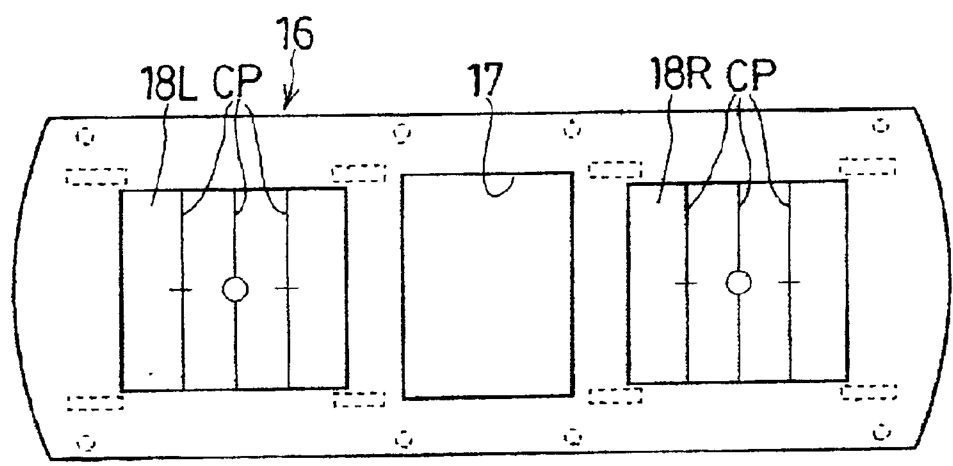
FIG. 6 is an elevational view of a collimation pattern mask, showing a conventional example.
Figure 7:
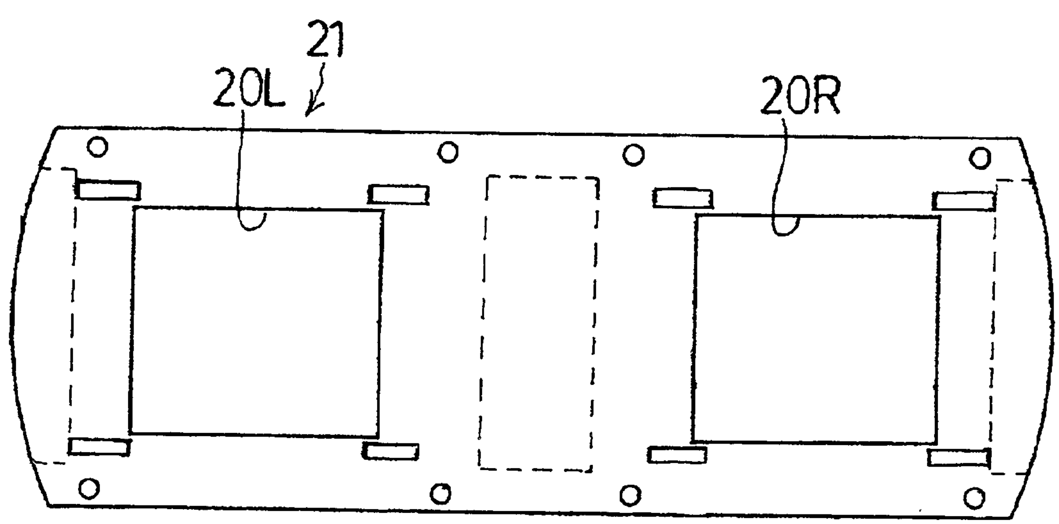
FIG. 7 is an elevational view of a cover frame, showing a conventional example.
Figure 8A:
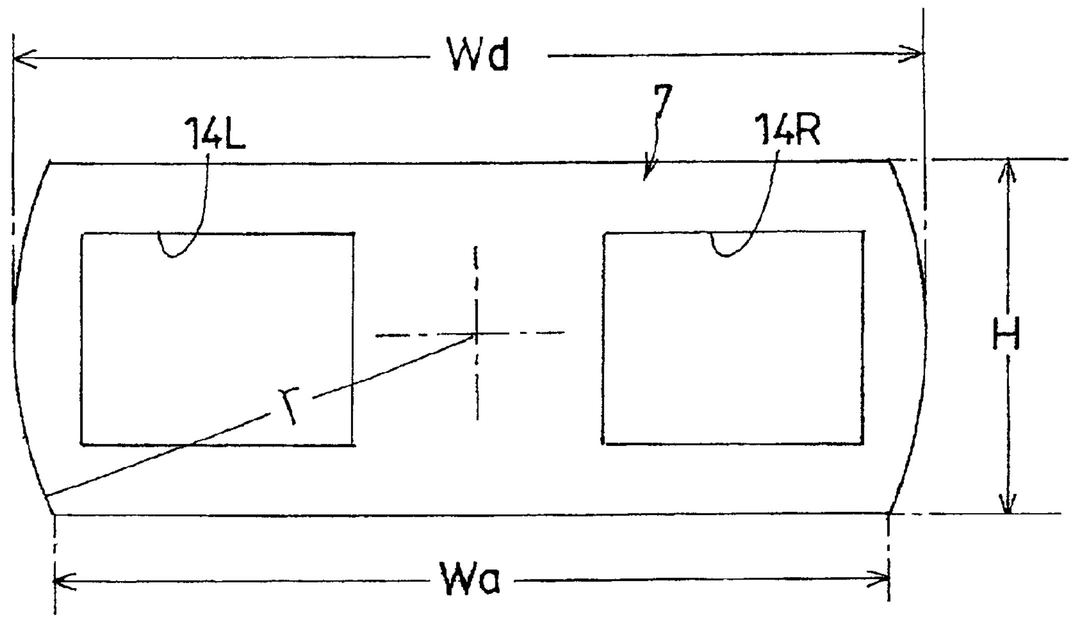
FIG. 8(*a*) is an elevational view of a circular-arc stereo slide mount, showing a conventional example.
Figure 8B:
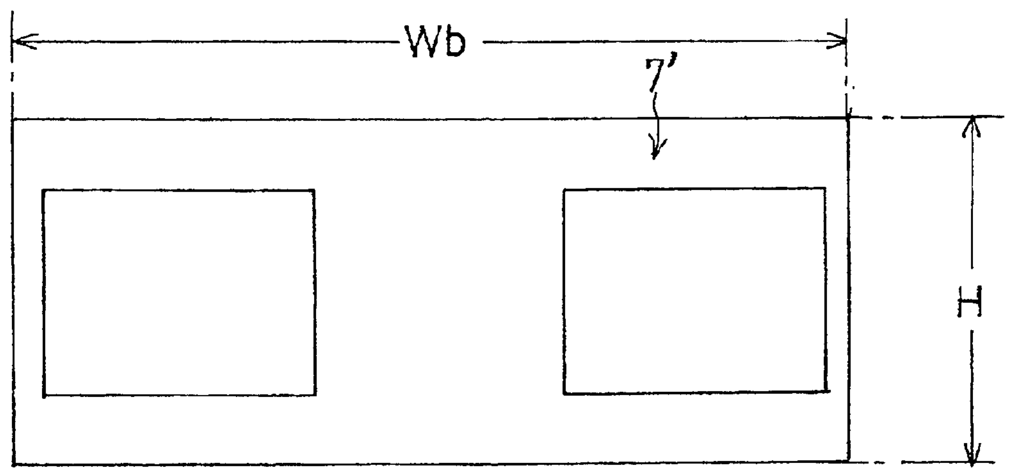
Figure 9A:
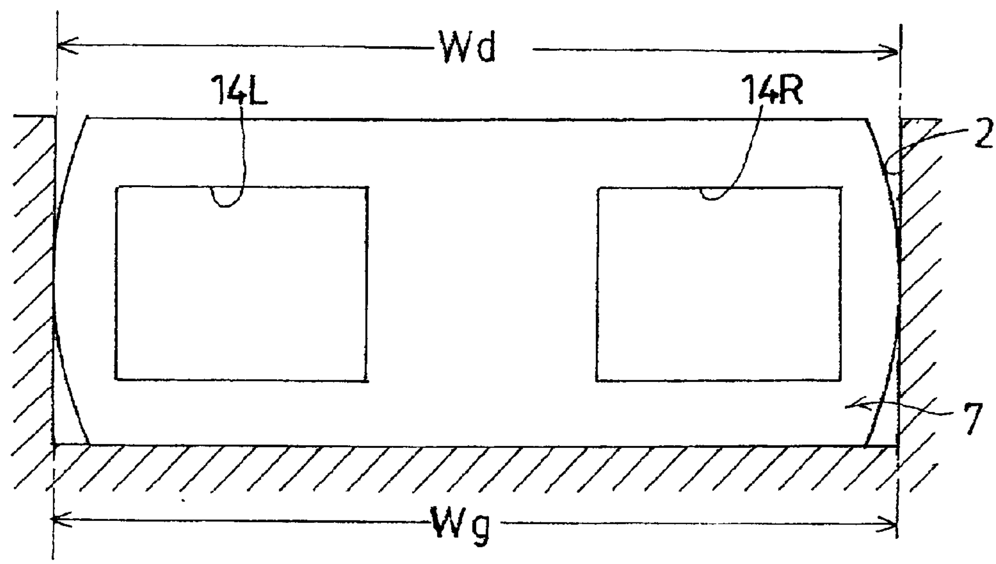
FIG. 9(*a*) shows a conventional example, and is a longitudinal sectional view of a slide mount holder section loaded with a circular-arc stereo slide mount.
Figure 9B:
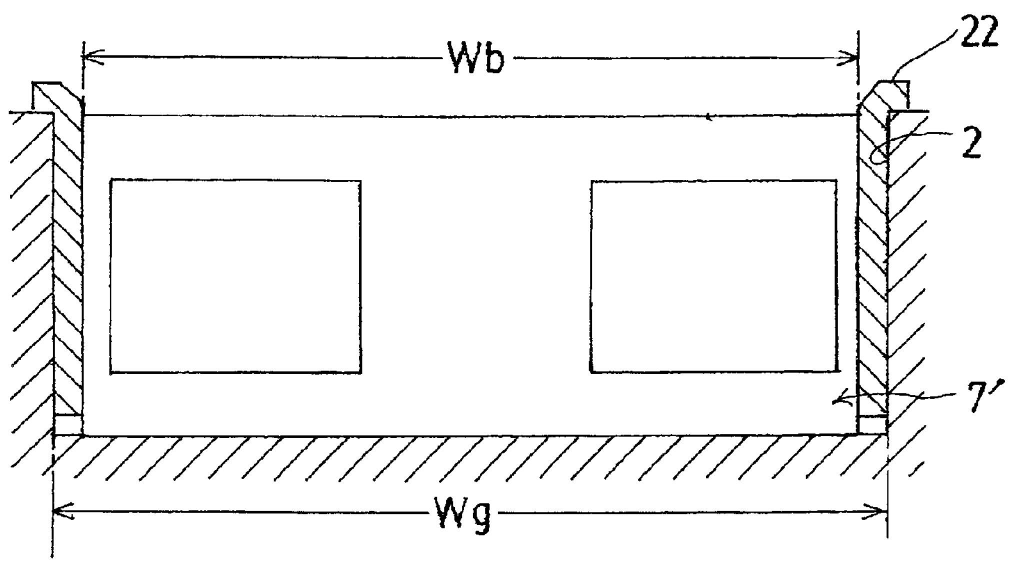

In FIG. 3(_a_), reference symbol 25 denotes a slide mount holder section in the invention according to the third aspect, and the slide mount holder section 25 is applicable for both of a stereo slide viewer comprising a film pitch adjusting apparatus and a stereo slide viewer not comprising the film pitch adjusting apparatus. The left and right internal walls 25_a_ and 25_b_ of the slide mount holder section 25 are formed in a curved shape protruding inwards over a predetermined length S2 in the loading direction from a loading port 25_c_ of the stereo slide mount 7, and formed slantwise so as to be narrowed in the loading direction from the position of the predetermined length S2, and the distance between the left and right internal walls 25_a_ and 25_b_ in an internal bottom portion 25_d_ of the slide mount holder section is formed so as to become substantially the same size as the left-right length Wa of the loading point 7_a_ of the stereo slide mount 7.

Therefore, the stereo slide mount 7 can be smoothly loaded into the slide mount holder section 25, and since the loading point 7_a_ of the stereo slide mount 7 is fitted between the left and right internal walls 25_a_ and 25_b_ in the internal bottom portion 25_d_ of the slide mount holder section 25, positioning is easy. Moreover, since the left and right internal walls 25_a_ and 25_b_ formed in a curved form in the predetermined length S2 and the left and right opposite ends of the stereo slide mount 7 come in contact with each other, highly accurate positioning is possible, and the positioning condition is maintained. Hence, when this slide mount holder section 25 is used, coming up of the stereo slide mount 7 does not occur.

Moreover, as shown in FIG. 3(_b_), even in a case where the rectangular stereo slide mount 7' is loaded into the slide mount holder section 25, the loading point 7'_a_ of the rectangular stereo slide mount 7' is positioned with the left and right internal walls 25_a_ and 25_b_ in the internal bottom portion 25_d_ of the slide mount holder section 25, thereby loading and positioning become easy, and it is not necessary to use the adapter in the conventional case.

It is a matter of course that the present invention can be variously modified without departing from the scope of the invention, and the present invention covers all the modification.

What is claimed is:

1. A stereo slide viewer comprising left and right ocular lenses, and a grooved slide mount holder section for selectively loading a rectangular stereo slide mount and a stereo slide mount having the left and right opposite ends in a circular-arc shape, each stereo slide mount having a loading point edge with a left-right length in front of said left and right ocular lenses, wherein left and right internal walls of said slide mount holder section are formed slantwise such that the distance between the internal walls is narrowed in the loading direction of the stereo slide mount, and the distance between the left and right internal walls in the internal bottom portion of the slide mount holder section is formed so as to become substantially the same size as the left-right length of the loading point edge of the stereo slide mount, so that the loading point edge of the stereo slide mount is positioned with the left and right internal walls in the internal bottom portion of the slide mount holder section.

2. A stereo slide viewer comprising left and right ocular lenses, and a grooved slide mount holder section for selectively loading a rectangular stereo slide mount and a stereo slide mount having the left and right opposite ends in a circular-arc shape, each stereo slide mount having a loading point edge with a left-right length, in front of said left and right ocular lenses, wherein left and right internal walls of said slide mount holder section are formed such that said left and right internal walls are provided in parallel over a predetermined length in the loading direction from a loading port of said stereo slide mount holder, as well as being formed slantwise so as to be further narrowed in the loading direction from the position of said predetermined length, and the distance between the left and right internal walls in the internal bottom portion of the slide mount holder section is formed so as to become substantially the same size as the left-right length of the loading point edge of the stereo slide mount, so that the loading point edge of the rectangular stereo slide mount is positioned with the left and right internal walls in the internal bottom portion of the slide mount holder section, and the opposite ends of the circular-arc stereo slide mount is positioned with the left and right internal walls in said predetermined length.

3. A stereo slide viewer comprising left and right ocular lenses, and a grooved slide mount holder section for selectively loading a rectangular stereo slide mount and a stereo slide mount having the left and right opposite ends in a circular-arc shape, each stereo slide mount having a loading point edge with a left-right length, in front of said left and right ocular lenses, wherein left and right internal walls of said slide mount holder section are formed in a curved shape protruding inwards over a predetermined length in the loading direction from a loading port of said stereo slide mount holder, and formed slantwise so as to be narrowed in the loading direction from the position of the curved shape protruding inwards over the predetermined length, and the distance between the left and right internal walls in the internal bottom portion of the slide mount holder section is formed so as to become substantially the same size as the left-right length of the loading point edge of the stereo slide mount, so that the loading point edge of the rectangular stereo slide mount is positioned with the left and right internal walls in the internal bottom portion of the slide mount holder section, and the opposite ends of the circular-arc stereo slide mount is positioned with the curved left and right internal walls in said predetermined length.

4. A stereo slide viewer having right and left ocular lenses capable of selectively loading a rectangular stereo slide mount having a slide mount length and a shaped stereo slide mount having right and left opposite ends in a circular-arc shape and a loading point edge length comprising:

a slide mount holder section having left and right internal walls and an internal bottom portion having a bottom length, said left and right internal walls formed slantwise such that the distance between the internal walls is narrowed in a loading direction towards the internal bottom portion, the bottom length being substantially the same as each of the slide mount length of the rectangular stereo slide mount and the loading point edge length of the shaped stereo slide mount, whereby either one of the rectangular stereo slide mount and the shaped stereo slide mount is capable of being accurately positioned and securely held within said slide mount holder section.

5. A stereo slide viewer as in claim 4 wherein:

the left and right internal walls each comprise a single continuous slant extending to the internal bottom portion.

6. A stereo slide viewer as in claim 4 wherein:

the left and right internal walls each comprise a substantially parallel portion and a slanted portion extending to the internal bottom portion.

7. A stereo slide viewer having right and left ocular lenses capable of selectively loading a rectangular stereo slide mount having a slide mount length and a shaped stereo slide mount having right and left opposite ends in a circular-arc shape and a loading point edge length comprising:

a slide mount holder section having left and right internal walls and an internal bottom portion having a bottom length, said left and right internal walls formed slantwise such that the distance between the internal walls is narrowed in a loading direction towards the internal bottom portion, wherein the left and right internal walls each comprise inwardly extending curved portion and a slanted portion extending to the internal bottom portion, the bottom length being substantially the same as each of the slide mount length of the rectangular stereo slide mount and the loading point edge length of the shaped stereo slide mount, whereby either one of the rectangular stereo slide mount and the shaped stereo slide mount is capable of being accurately positioned and securely held within said slide mount holder section.

8. A stereo slide viewer system having right and left ocular lenses comprising:

a rectangular stereo slide mount having a rectangular stereo slide mount length;

a shaped stereo slide mount having right and left opposite ends in a circular-arc shape and having a loading point edge length; and a slide mount holder section having left and right internal walls and an internal bottom portion having a bottom length, the bottom length being substantially equal to each of the rectangular stereo slide mount length and the loading point edge length, whereby either one of said rectangular stereo slide mount and said shaped stereo slide mount is capable of being accurately positioned and securely held within said slide mount holder section.

9. A stereo slide viewer system as in claim 8 wherein:

the left and right internal walls each comprise a single continuous slant extending to the internal bottom portion.

10. A stereo slide viewer system as in claim 8 wherein:

the left and right internal walls each comprise a substantially parallel portion and a slanted portion extending to the internal bottom portion.

11. A stereo slide viewer system having right and left ocular lenses comprising:

a rectangular stereo slide mount having a rectangular stereo slide mount length;

a shaped stereo slide mount having right and left opposite ends in a circular-arc shape and having a loading point edge length; and a slide mount holder section having left and right internal walls and an internal bottom portion having a bottom length, wherein the left and right internal walls each comprise an inwardly extending curved portion and a slanted portion extending to the internal bottom portion, the bottom length being substantially equal to each of the rectangular stereo slide mount length and the loading point edge length, whereby either one of said rectangular stereo slide mount and said shaped stereo slide mount is capable of being accurately positioned and securely held within said slide mount holder section.

* * * * *